US010339032B2

(12) United States Patent
Kirbach et al.

(10) Patent No.: US 10,339,032 B2
(45) Date of Patent: Jul. 2, 2019

(54) SYSTEM FOR MONITORING AND REPORTING PERFORMANCE AND CORRECTNESS ISSUES ACROSS DESIGN, COMPILE AND RUNTIME

(71) Applicant: MICROSOFT TECHNOLOGY LICENSING, LLC, Redmond, WA (US)

(72) Inventors: Steven Kirbach, Seattle, WA (US); Christophe Philippona, Seattle, WA (US); Harikrishna Menon Ajith Kumar, Bellevue, WA (US); Unnikrishnan Ravindranathan, Issaquah, WA (US); Daniel Zilcsak, Sammamish, WA (US); David William Shoots, Hollis, NH (US); Fabian Toader, Sammamish, WA (US)

(73) Assignee: Microsoft Technology Licensing, LLD, Redmond, WA (US)

( * ) Notice: Subject to any disclaimer, the term of this patent is extended or adjusted under 35 U.S.C. 154(b) by 60 days.

(21) Appl. No.: 15/168,191

(22) Filed: May 30, 2016

(65) Prior Publication Data
US 2017/0286275 A1    Oct. 5, 2017

Related U.S. Application Data

(60) Provisional application No. 62/314,937, filed on Mar. 29, 2016.

(51) Int. Cl.
*G06F 11/07* (2006.01)
*G06F 11/36* (2006.01)

(52) U.S. Cl.
CPC ...... *G06F 11/3668* (2013.01); *G06F 11/0706* (2013.01); *G06F 11/079* (2013.01)

(58) Field of Classification Search
None
See application file for complete search history.

(56) References Cited

U.S. PATENT DOCUMENTS 6,324,647 B1 * 11/2001 Bowman-Amuah ............ H04L 63/0227 713/153
6,536,037 B1 * 3/2003 Guheen .................... G06F 8/71 717/151

(Continued)

OTHER PUBLICATIONS

Symons, Charles. "Software Development and Spelling in your Source Code." G-Hacks, Apr. 24, 2011, www.ghacks.net/2011/04/24/software-development-and-spelling-in-your-source-code/. Accessed Aug. 28, 2017.*

(Continued)

*Primary Examiner* — Wei Y Zhen
*Assistant Examiner* — Binh Luu

(57) ABSTRACT

Technologies are disclosed for providing developers with rule output indicating that issues are or may be present in the code they are developing. Such rule output can include or be accompanied by guidelines and/or best practices structured to aid developers in becoming aware of and resolving the issues. In one example, this involves identifying the issues, making available a mechanism of further investigating the issues, and providing best practices and/or recommended solutions for the issues. Finally, the technologies disclosed may automate application of the recommended solutions. The notifications and accompanying guidance/automation and the like can be provided at design-time, compile-time, and/or run-time with the notifications and accompanying guidance/automation integrated into editors, compilers, debuggers, and other development environment tools providing true real-time and in situ development experience.

20 Claims, 4 Drawing Sheets

(56) References Cited

U.S. PATENT DOCUMENTS

| | | | |
|---|---|---|---|
| 7,020,697 B1 | 3/2006 | Goodman | |
| 7,194,445 B2 | 3/2007 | Chan | |
| 7,360,202 B1* | 4/2008 | Seshadri | G06F 17/30867 |
| | | | 707/E17.109 |
| 7,464,366 B2 | 12/2008 | Shukla | |
| 7,539,974 B2 | 5/2009 | Beck | |
| 7,565,642 B2 | 7/2009 | Moore | |
| 7,975,254 B2 | 7/2011 | Gilboa | |
| 8,887,125 B1 | 11/2014 | Nolan | |
| 8,997,055 B2 | 3/2015 | van Gogh | |
| 2001/0052108 A1* | 12/2001 | Bowman-Amuah | |
| | | | G06Q 10/06 |
| | | | 717/100 |
| 2002/0078106 A1* | 6/2002 | Carew | G06F 17/273 |
| | | | 715/257 |
| 2005/0240943 A1* | 10/2005 | Smith | G06F 9/465 |
| | | | 719/328 |
| 2006/0053422 A1* | 3/2006 | Alikacem | G06F 11/3668 |
| | | | 718/100 |
| 2006/0059253 A1* | 3/2006 | Goodman | G06Q 10/10 |
| | | | 709/223 |
| 2007/0050679 A1* | 3/2007 | Reddy | G06F 11/3688 |
| | | | 714/38.1 |
| 2008/0196006 A1* | 8/2008 | Bates | G06F 9/542 |
| | | | 717/109 |
| 2009/0182689 A1 | 7/2009 | Chiles | |
| 2010/0058313 A1* | 3/2010 | Hansmann | G06F 8/68 |
| | | | 717/168 |
| 2011/0078103 A1 | 3/2011 | Teng | |
| 2012/0144376 A1* | 6/2012 | Van Eijndhoven | G06F 8/456 |
| | | | 717/146 |
| 2015/0033202 A1* | 1/2015 | Wilson | G06F 8/43 |
| | | | 717/106 |
| 2015/0269060 A1* | 9/2015 | Rodmell | G06F 11/3664 |
| | | | 717/124 |
| 2015/0370690 A1* | 12/2015 | Rodmell | G06F 8/72 |
| | | | 717/124 |
| 2017/0091073 A1* | 3/2017 | Abadi | G06F 8/00 |

OTHER PUBLICATIONS

Microsoft, "Getting Started with Debugging in Visual Studio 2015." Microsoft Developer Network, Apr. 16, 2015, <msdn.microsoft.com/en-us/library/dn986851.aspx>. Accessed Apr. 16, 2018.*

European Patent Office, Officer Sophie Renault, PCT International Search Report and Written Opinion for Application No. PCT/US2017/024404, dated Jun. 19, 2017, 10 pages, Netherlands.

"Oracle Business Process Management Suite Overview", Retrieved on: Mar. 22, 2016.

Sharifi, "Monitoring HPC Applications in the Production Environment", In Proceedings of the 2nd Workshop on Parallel Programming for Analytics Applications (PPAA'15), Feb. 8, 2015.

* cited by examiner

SYSTEM FOR MONITORING AND REPORTING PERFORMANCE AND CORRECTNESS ISSUES ACROSS DESIGN, COMPILE AND RUNTIME

RELATED APPLICATION(S)

This application claims benefit from U.S. Provisional Application No. 62/314,937 that was filed on Mar. 29, 2016, and that is incorporated herein by reference in its entirety.

BACKGROUND

Detection of application correctness issues can aid in the development of more efficient and high quality applications. There have been a number of solutions such the FXCop and Rosyln analyzers that detect application correctness issues, but they do it with very low fidelity during compile and build time. This significantly reduces their effectiveness since they do not calculate actual impact to applications or identify application correction issues when the application is deployed using real data and services. A number of issues fall through the cracks with such tools. Significant improvement in the field of detecting application correctness issues is needed at each stage of the development path.

SUMMARY

The summary provided in this section summarizes one or more partial or complete example embodiments of the technologies described herein in order to provide a basic high-level understanding to the reader. This summary is not an extensive description of the technologies and it may not identify key elements or aspects of the technologies, or delineate the scope of the technologies. Its sole purpose is to present various aspects of the technologies in a simplified form as a prelude to the detailed description provided below. The technologies as a whole shall not be limited to any particular embodiment(s) or example(s) or combination(s) thereof provided herein.

Application developers (i.e., the persons that create code and the like) may encounter performance and other issues, for example, with code which can often be easily avoided based on a set of rules and/or best practices. Guidance as to how to avoid common performance and other issues is often readily available. However, performance minded developers, for example, are not always aware they are running into a particular issue, and non-performance minded developers may not even be aware that a particular issue exists.

Existing analysis tools tend to be limited in several ways. For example, existing tools can only analyze code in compiled form, but not source code and related source files or executable code operating in its intended run-time environment. Additionally, conventional analyzers typically include command line functionality and may have their own graphical interfaces, but typically do not integrate with the primary development tools used in the development process such as editors, compilers, debuggers, and the like. Nor do they operate in real-time while a developer is, for example, entering source code in an editor or other development environment, detecting and identifying issues and providing potential solutions as code is entered in situ. Nor do they operate in real-time while a developer is, for example, debugging executable code in a debugger or debugging environment, detecting and identifying issues and providing potential solutions as code is debugged in situ. Instead, existing analysis tools tend to require the addition of a separate analysis step in the development path from design to execution. And reports that are produced during the added analysis step must be interpreted by the developer with any suggestion or recommendation manually implemented by the developer.

The technologies disclosed herein provide developers with rule output that issues are or may be present in the code they are developing. Such rule output can include or be accompanied by guidelines and/or best practices structured to aid developers in becoming aware of and resolving the issues. In one example, this involves identifying the issues, making available a mechanism of further investigating the issues, and providing best practices and/or recommended solutions for the issues. Finally, the technologies disclosed herein may automate application of the recommended solutions. The notifications and accompanying guidance/automation and the like can be provided at design-time, compile-time, and/or run-time with the notifications and accompanying guidance/automation integrated into editors, compilers, debuggers, and other development environment tools providing true real-time and in situ development experience.

The term "code" as used herein typically refers to any type or form of computer-executable or interpretable instructions or specifications used in a computing environment including source code in any language, machine code, intermediate code, executable code, interpretable code, scripts, distributed code, user interface specifications and instructions, information in mark-up languages, software, firmware, applications, and the like.

DESCRIPTION OF THE DRAWINGS

The detailed description provided below will be better understood when considered in connection with the accompanying drawings, where.

Like-numbered labels in different figures are used to designate similar or identical elements or steps in the accompanying drawings.

DETAILED DESCRIPTION

The detailed description provided in this section, in connection with the accompanying drawings, describes one or more partial or complete example embodiments of the technologies, but is not intended to describe all possible embodiments of the technologies. This detailed description sets forth various examples of at least some of the systems and/or methods of the technologies. However, the same or equivalent technologies, systems, and/or methods may be realized according to other examples as well.

Computing Environments

Although the examples provided herein are described and illustrated as being implementable in a computing environment, the environment described is provided only as an example and not a limitation. As those skilled in the art will appreciate, the examples disclosed are suitable for implementation in a wide variety of different computing environments.

Figure 1:
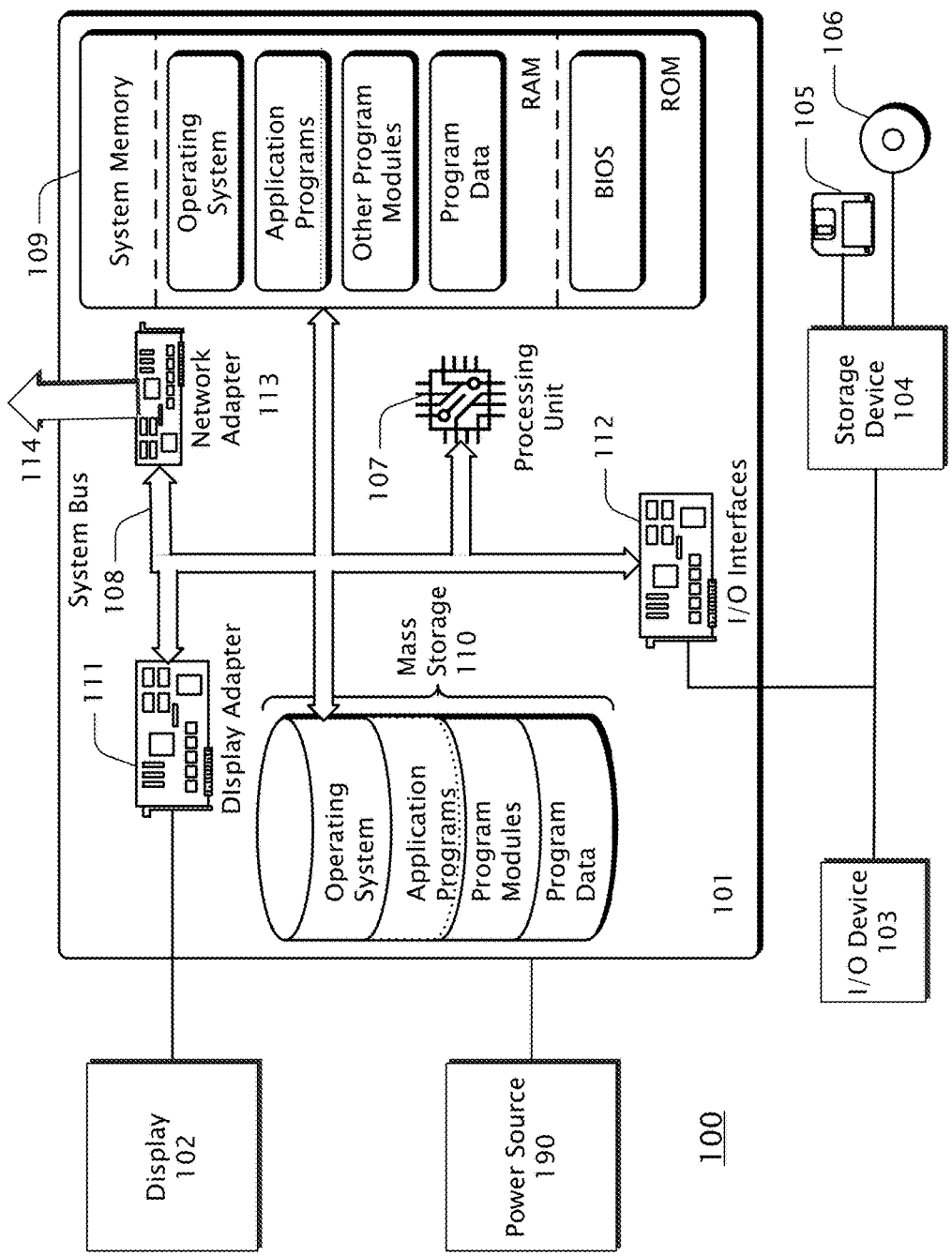
FIG. 1 is a block diagram showing an example computing environment in which the technologies described herein may be implemented.

FIG. 1 is a block diagram showing an example computing environment 100 in which the technologies described herein may be implemented. A suitable computing environment may be implemented with any of numerous general purpose or special purpose devices and/or systems. Examples of such devices/systems include, but are not limited to, personal digital assistants ("PDA"), personal computers ("PC"), hand-held or laptop devices, microprocessor-based systems, multiprocessor systems, systems on a chip ("SOC"), servers, Internet services, workstations, consumer electronic devices, cell phones, set-top boxes, and the like. In all cases, such systems are strictly limited to articles of manufacture and the like.

Computing environment 100 typically includes at least one computing device 101 coupled to various components, such as peripheral devices 102, 103, 101 and the like. These may include components such as input devices 103 such as voice recognition technologies, touch pads, buttons, keyboards and/or pointing devices, such as a mouse or trackball, that may operate via one or more input/output ("I/O") interfaces 112. The components of computing device 101 may include one or more processors (including central processing units ("CPU"), graphics processing units ("CPU"), microprocessors ("µP"), and the like) 107, system memory 109, and a system bus 108 that typically couples the various components. Processor(s) 107 typically processes or executes various computer-executable instructions and, based on those instructions, controls the operation of computing device 101. This may include the computing device 101 communicating with other electronic and/or computing devices, systems or environments (not shown) via various communications technologies such as a network connection 114 or the like. System bus 108 represents any number of bus structures, including a memory bus or memory controller, a peripheral bus, a serial bus, an accelerated graphics port, a processor or local bus using any of a variety of bus architectures, and the like. The term "computing device" as used herein, unless preceded with the word "virtual", refers strictly to a physical article(s) of manufacture or the like. The terms "virtual computing device" and "virtual machine" typically refer to an emulation of a particular computing system and are commonly referred to as a virtual machine ("VM"). Such VMs, to be operational, are ultimately hosted on a non-virtual computing device(s).

System memory 109 may include computer-readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 109 typically stores data, computer-executable instructions and/or program modules comprising computer-executable instructions that are immediately accessible to and/or presently operated on by one or more of the processors 107. The term "system memory" as used herein refers strictly to a physical article(s) of manufacture or the like.

Mass storage devices 104 and 110 may be coupled to computing device 101 or incorporated into computing device 101 via coupling to the system bus. Such mass storage devices 104 and 110 may include non-volatile RAM, a magnetic disk drive which reads from and/or writes to a removable, non-volatile magnetic disk (e.g., a "floppy disk") 105, and/or an optical disk drive that reads from and/or writes to a non-volatile optical disk such as a CD ROM, DVD ROM 106. Alternatively, a mass storage device, such as hard disk 110, may include non-removable storage medium. Other mass storage devices may include memory cards, memory sticks, tape storage devices, and the like. The term "mass storage device" as used herein refers strictly to a physical article(s) of manufacture or the like.

Any number of computer programs, files, data structures, and the like may be stored in mass storage 110, other storage devices 104, 105, 106 and system memory 109 (typically limited by available space) including, by way of example and not limitation, operating systems, application programs, data files, directory structures, computer-executable instructions, and the like.

Output components or devices, such as display device 102, may be coupled to computing device 101, typically via an interface such as a display adapter 111. Output device 102 may be a liquid crystal display ("LCD"). Other example output devices may include printers, audio outputs, voice outputs, cathode ray tube ("CRT") displays, tactile devices or other sensory output mechanisms, or the like. Output devices may enable computing device 101 to interact with human operators or other machines, systems, computing environments, or the like. A user may interface with computing environment 100 via any number of different I/O devices 103 such as a touch pad, buttons, keyboard, mouse, joystick, game pad, data port, and the like. These and other I/O devices may be coupled to processor(s) 107 via I/O interfaces 112 which may be coupled to system bus 108, and/or may be coupled by other interfaces and bus structures, such as a parallel port, game port, universal serial bus ("USB"), fire wire, infrared ("IR") port, and the like.

Computing device 101 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 101 may be coupled to a network via network adapter 113 or the like, or, alternatively, via a modem, digital subscriber line ("DSL") link, integrated services digital network ("ISDN") link, Internet link, wireless link, or the like.

Communications connection 114, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 190, such as a battery or a power supply, typically provides power for portions or all of computing environment 100. In the case of the computing environment 100 being a mobile device or portable device or the like, power source 190 may be a battery. Alternatively, in the case computing environment 100 is a desktop computer or server or the like, power source 190 may be a power supply designed to connect to an alternating current ("AC") source, such as via a wall outlet.

Some mobile devices may include only a few of the components described in connection with FIG. 1. For example, an electronic badge may be comprised of a coil of wire or the like along with a simple processing unit 107 or the like, the coil configured to act as power source 190 when in proximity to a card reader device or the like. Such a coil may also be configured to act as an antenna coupled to the processing unit 107 or the like, the coil antenna capable of radiating/receiving communications between the electronic badge and another device such as a card reader device. Such communications may not involve networking, but may alternatively be general or special purpose communications via telemetry, point-to-point, RF, IR, audio, or other means. An electronic card may not include display 102, I/O device 103, or many of the other components described in connection with FIG. 1. Other mobile devices that may not include many of the components described in connection with FIG. 1, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" as used herein typically includes and refers to executable instructions, code, data, applications, programs, program modules, or the like maintained in an electronic device such as a ROM. The term "software" as used herein typically includes and refers to computer-executable instructions, code, data, applications, programs, program modules, firmware, and the like maintained in or on any form or type of computer-readable media that is configured for storing computer-executable instructions or the like in a manner that may be accessible to a computing device.

The terms "computer-readable medium", "computer-readable media", and the like as used herein and in the claims are limited to referring strictly to one or more statutory apparatus, article of manufacture, or the like that is not a signal or carrier wave per se. Thus, computer-readable media, as the term is used herein, is intended to be and must be interpreted as statutory subject matter.

The term "computing device" as used herein and in the claims is limited to referring strictly to one or more statutory apparatus, article of manufacture, or the like that is not a signal or carrier wave per se, such as computing device 101 that encompasses client devices, mobile devices, one or more servers, network services such as an Internet services or corporate network services based on one or more computers, and the like, and/or any combination thereof. Thus, a computing device, as the term is used herein, is also intended to be and must be interpreted as statutory subject matter.

Figure 2:
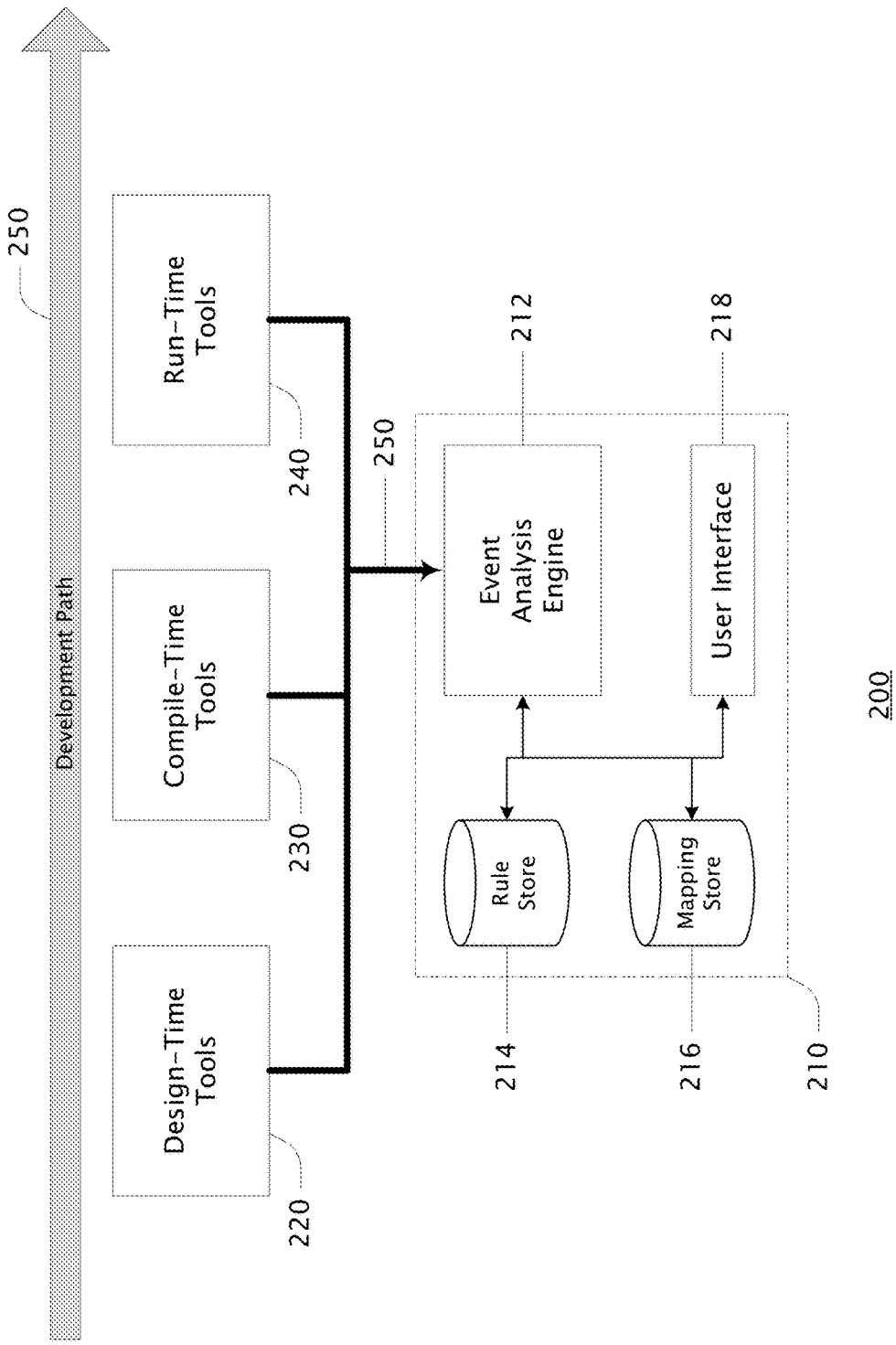
FIG. 2 is a block diagram showing an example development environment 200 that illustrates an development path 250 that includes a design phase in which design-time tools 220 are used, a compile phase in which compile-time tools 230 are used, and a run-time phase in which run-time tools 240 are used, and further illustrates system 210 that enables application developers to monitor and report performance, correctness, and other issues with applications being developed to the developers.

FIG. 2 is a block diagram showing an example development environment 200 that illustrates an development path 250 that includes a design phase in which design-time tools 220 are typically used, a compile phase in which compile-time tools 230 are typically used, and a run-time phase in which run-time tools 240 are typically used. System 210 (also referred to herein as an "Application Analyzer" or "App Analyzer") enables application developers to monitor and report performance, correctness, and other issues with code being developed. These various tools typically provide or otherwise make available (such as by various events) to system 210 data sufficient to determine these issues. In one example, these issues may be determined based on analysis of events 250 by event analysis engine 212 (also referred to herein as a "rules engine") in combination with various rules that may be stored in rule store 214 or the like. The results of such analysis are typically surfaced to user interface 218 and/or a log(s) or the like in the form of rule output that identifies the issues determined. Event analysis engine 212 may be implemented in hardware, software, and or any combination thereof. Events may be received by system 210 or its components via any suitable interface including input/output interface 112, network adapter 113, and/or any other software interface or electronic mechanism.

Mapping store 216 typically comprises information sufficient for engine 212 to map incoming events to rule(s) for analysis by or according to the rule(s). In the event that a particular rule indicates there is an issue, that rule may surface a warning or the like in the form of rule output that may be presented at least in part via user interface 218 or the like. System 210, or some other intermediary, may format such rule output for presentation to the developer(s) of the code via one or more user interfaces. Further, such user interfaces may be hosted by one or more "UI hosts," a term that typically refers to system 210 when including UI 218, to any of tools 220, 230, and 240, and/or to any other tool(s) or the like that presents at least a portion of rule output in a user interface or in a log. The term "development tool" as used herein typically refers to any of tools 220, 230, and 240 and the like. Such development tools may be implemented in hardware, software, or any combination thereof.

In one example, rule store 214 and/or mapping store 216 are/is a part of system 210. In an alternate example, rule store 214 and/or mapping store 216 are/is implemented external to system 210. In yet another example, either or both stores may be implemented as multiple data stores that are provided by various entities, where some may be inside system 210 and some outside.

In one example, user interface 218 allows rules to be created and added to rule store 214 or the like, and further allows for such rules to be categorized, updated, edited, removed, deleted, tested, debugged, enabled and disabled individually and/or in groups, and otherwise managed within or by system 210. User interface 218 may also allow rules to be associated or otherwise mapped to incoming events such as from the development tools 220, 230, 240, and the like, and/or to various categories or classifications of rules. For example, some rules may be directed to best practices and therefore categorized as "best practice" rules or the like. Other rules may be directed to, for example, application performance, accessibility, localization, or any other aspect of application development and/or operation or the like that may be of interest to developers and/or application users, and such rules may be so categorized. Further, each rule may be categorized in one category or in multiple categories. Rule management and mapping as described above may also be accomplished via a command line interface, an application programming interface ("API"), and/or any other mechanism in addition or alternate to user interface 218. Additionally or alternatively, system 210 may include pre-defined rules and/or categories or classifications of rules such that system 210 may be utilized without requiring users to first define rules.

In one example, user interface 218 is included as a part of system 210. In an alternate example, user interface 218 is implemented outside of system 210. An in yet another example, user interface 218 may be implemented as multiple user interfaces that each provide similar and/or different functionality and that are provided by various entities, some inside system 210 and some outside.

Examples of UI hosts typically include development tools or products such as editors, debuggers, compilers, browsers, web application development tools, development environments, user interface design tools, and any other design-time tools, compile-time tools, run-time tools, and the like.

The term "design-time" as used herein refers to the time(s) at which a developer(s) or the like is designing code such as by entering designs, instructions, specification, descriptions, declarations, flow specifications, state specifications, user interface specifications, rules, sequences, code, scripts, objects, models, or the like such as used in application development into any design-time tool or environment or the like, such as design-time tools 220. Microsoft Visual Studio is an example of such a design-time tool that may also fit into the other development tool categories (compile-time and run-time) as well.

The term "compile-time" as used herein refers to the time(s) at which a developer(s) or the like is compiling, assembling, linking, or otherwise converting code or the like, including but not limited to source code and intermediate code, into executable code such as an executable application(s), and/or the time(s) at which a developer(s) or the like is using a tools(s) to interpret code, including but not limited to scripts. Those skilled in the art will recognize that such code interpretation may additionally or alternatively be considered a run-time activity.

The term "run-time" as used herein refers to the time(s) at which a developer(s) or the like is running (i.e., executing including via an interpreter) code for purposes including debugging, testing, evaluating the code.

Events, Rules, and Issues

Figure 3:
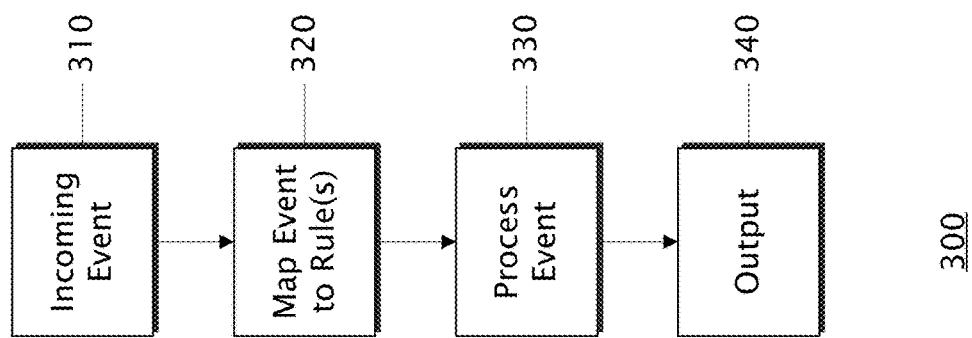
FIG. 3 is a block diagram showing an example method 300 for processing events that includes receiving an event 310, mapping an event to a rule(s) 320, processing the mapped event 330 to identify any issue(s) and/or generate state information, and providing appropriate rule output 340 regarding any identified issue(s).

FIG. 3 is a block diagram showing an example method 300 for processing events that includes receiving an event 310, mapping an event to a rule(s) 320, processing the mapped event 330 to identify any issue(s) and/or generate state information, and providing appropriate rule output 340 regarding any identified issue(s).

Block 310 typically indicates receiving an incoming event(s). In one example, events are received by event analysis engine 212 of system 210. Incoming events are typically provided by the various tools utilized along the development path 250, such as design-time tools 220, compile-time tools 230, run-time tools 240, and the like. Such incoming events typically regard particular code being developed at the various stages along the development path 250.

The term "event" as used herein typically refers to any development information regarding the code provided by tools 220, 230, 240, and the like. An event may indicate development information by including the development information as a part of the event, by referencing the development information via some link(s) or pointer(s) or the like in the event, or any combination thereof. Development information typically identifies a design-time notification(s) from a design-time tool, a compile-time notification(s) from a compile-time tool, and/or a run-time notification(s) from a run-time tool. Such development information and notifications are generally provided proactively by tools in the form of an event.

In one example, an event includes an event type identifier that identifies a type of the event. Such an event type identifier may be a unique identifier such as a global unique identifier ("GUID") or the like that uniquely distinguishes one event from others. An event may also include a source identifier that identifies the tool or other source from which the event originated. Once an event is received, method 300 typically continues at block 320.

Block 320 typically indicates mapping the received event to one or more rules. In one example, event analysis engine 212 maps the received event based on mapping information in mapping store 216 or the like to one or more rules in rule store 214 or the like. In one example, the mapping may be based on an event type identifier of the received event. For example, any rules interested in events of the received event type are identified from the mapping information that maps event types to rules.

In another example, events types may be grouped into one or more event categories or the like, and these categories may be mapped to rules. In this example, the mapping involves first identifying one or more categories in which the event type is grouped, and then mapping the one or more event categories to any interested rules. In general, event types and/or event categories may be mapped to rules, and such mappings may be determined, using any suitable mechanism(s). Once a received event is mapped to a particular rule, method 300 typically continues at block 330.

Block 330 typically indicates processing a received event according to the rule(s) to which it is mapped. In one example, events are processed by event analysis engine 212 of system 210 in accordance with the rules to which they are mapped. In another example, the events are processed entirely by the rules themselves and/or in part by the rules themselves and in part by event analysis engine 212.

One or more received events are typically processed according to a rule(s) in order to determine a whether or not a particular issue(s) exists in the code being analyzed by system 210. In one example, rules are implemented as a textual expression, such as in eXtensible Markup Language ("XML") or some other markup language or other textual format. In another example, rules are implemented in form of scripts or other instructions. Rules may be in the form of code.

State information may be persisted across multiple events and/or across processing according to one or more rules. Such state information may be used in the further processing of events and/or by rules. In one example, the result of event processing 330 may be the generation or modification of state information. Such state information may be based on events from the same tool and/or on events from one or more of any tools. Such state information may be persisted by system 210 and/or one or more of the rules themselves.

In another example, the result of event processing 330 may additionally or alternatively be the identification of one or more issues. The terms "issue" and "development issue" as used synonymously herein refer to a particular problem with code that can be corrected or improved based on rule output by system 210. A few non-limiting examples of such issues include the following:
  a. A user interface ("UI") thread that can be blocked or idled;
  b. Existence of a non-UI operation on a UI thread;
  c. A ListView that is not virtualized but that should be;
  d. A ListBox that is being used that should be a ListView; and
  e. Collapsed elements at startup.

Issues may be categorized in various ways. A few non-limiting example issue categorizations include: performance, user interface, accessibility, memory usage, cross-platform, threading, localization, code size, best practices, etc. Further, issues may additionally or alternatively be categorized according to design-time, compile-time, and/or run-time such as on development path 250. In general, issues that can be determined by system 210 are limited only by the rules that can be created and the events that can be surfaced from the tools to system 210. Further, one rule may identify one or more issues and multiple rules may inter-operate to identify an issue(s) based on one or more events and/or on state information. Once an issue has been identified, method 300 typically continues at block 340.

Figure 4:
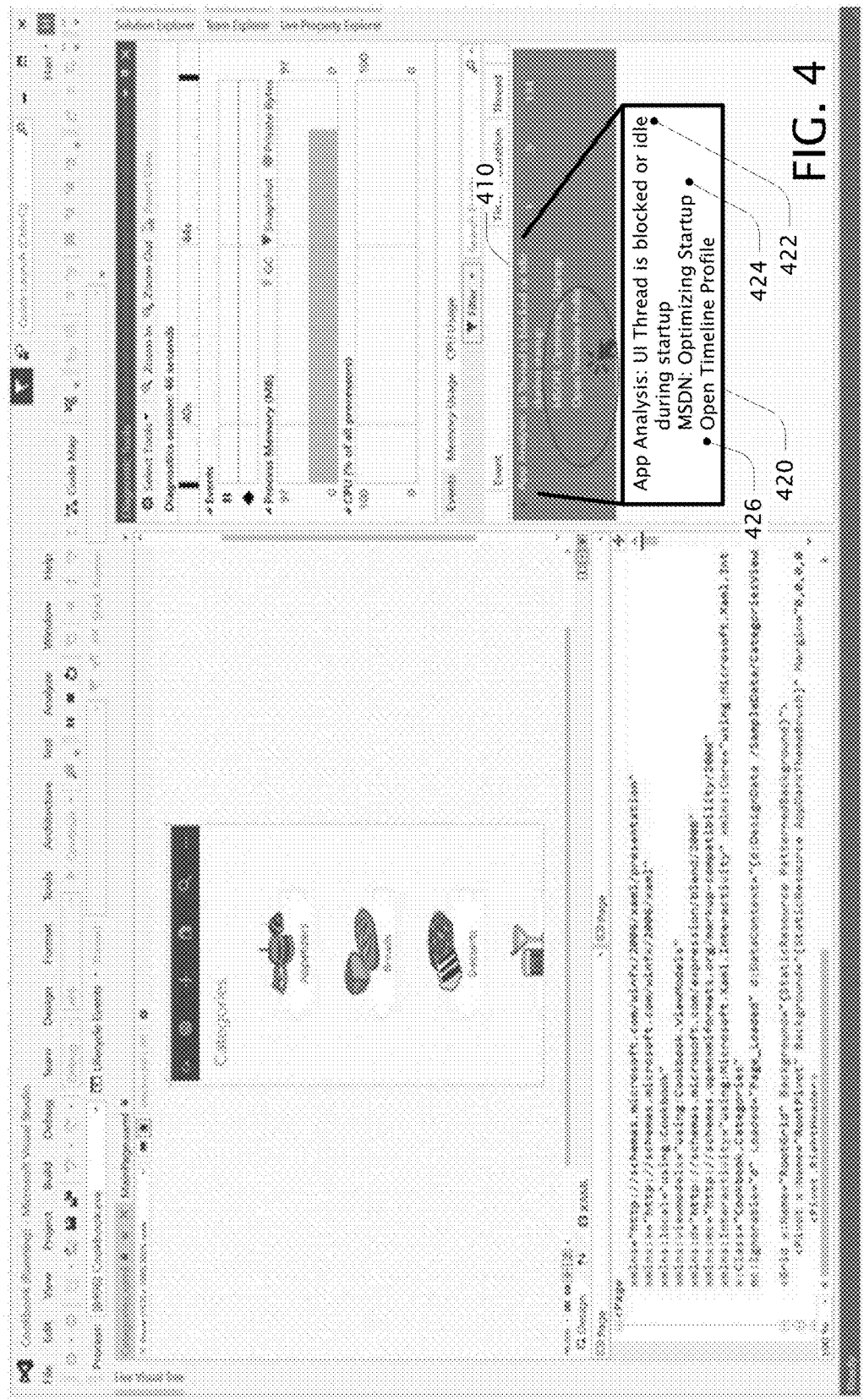
FIG. 4 shows an example host user interface presenting rule output 410 where the host is a debugger tool.

Block 340 typically indicates, for a given identified issue(s), providing rule output that makes available a mechanism of further investigating the issue(s), identifies a root cause(s) of the issues, and/or provides best practice information and/or recommended solutions for resolving the issue(s). Regarding the mechanism of further investigation, examples include automatically surfacing or identifying the code at issue in a debugger, profiler, code editor, UI editor, or the like—each such tool an example mechanism for further investigating the issue depending on the type of issue. In this manner, the developer is able to further investigate the issue in the context of an appropriate tool presented to the developer in response to system 210 identifying the issue. An example of surfacing an issue in a debugger is illustrated in FIG. 4.

Regarding the root cause(s), best practice information, and/or recommended solutions, system 210 may provide rule output via user interface 218, via one or more UI hosts, via tools such as the mechanism for further investigation discussed above, and/or via any other user interface(s). In one example, rule output may be formatted and structured based on a template such as the following:

```
<RuleID>UWPA%Integer%
  <RuleName>MyRuleName</RuleName>
  <Impact>
    <ImpactDescription>Behavior is causing a
    performance issue.</ImpactDescription>
    <Measurement Description="Memory"
    Value="xx"></Measurement>
    <Measurement Description="Time
    Elapsed"></Measurement>
  </Impact>
  <Cause>State the cause here if possible.</Cause>
  <ProposedSolution>
    <Decription> Consider changing things to solve the
```

-continued

```
    performance issue. </Description> [and/or]
    <DocLink>URL</DocLink>
  </ProposedSolution>
  <Actions>
    <Action Name="GotoTimeline" StartTime="x ms"
    EndTime="x ms">
    <Action Name="GotoSource" Line="12"
    Col="13"/>
  </Location>
</RuleId>
```

Using such a template enables UI hosts to consistently understand and interpret rule output for presentation in one or more user interfaces. In this example, the <RuleID> section typically uniquely identifies a rule. The <Rule-Name> section typically provides a descriptive name or title for the rule. The <Impact> section typically provides at least a summary of the impact of the issue(s) identified by the rule, and may also include additional details related to the issue(s). The <Cause> section typically provides at least a summary of the cause(s) of the issue(s) identified by the rule. The <ProposedSolution> section typically provides at least a summary of a proposed solution(s) or best practice(s) or the like for resolving the issue(s) identified by the rule, and may also include additional information or links that are typically related to resolving the issue(s). The <Actions> section typically provides at least one link to one or more mechanisms for further investigating the issue(s) identified by the rule, and may also include additional information and/or parameters regarding the issue(s) that may be passed to the mechanism for use by the mechanism in the investigating. In other examples, any suitable format and/or structure for organizing and providing rule output may be used.

Considering example (a) above—existence of a non-UI operation on a UI thread—rule output for this example issue may be formatted and structured using the template shown above as in the following example.

```
<RuleID>UWPA001
  <RuleName>UI thread blocked<RuleName>
  <Impact>
    <ImpactDescription>
      The UI thread for your app was idle or blocked
      during load time. This will increase load time.
    </ImpactDescription>
    <Measurement
    Description="Time"></Measurement>
  </Impact>
  <Cause>
```

Your UI thread utilization % dropped to xx on startup while loading your view.
Platform code for UI and your app's code for UI all are executed on the same UI thread. Only one instruction can execute on that thread at a time so if your app code takes too long to process an event then the framework can't run layout or raise new events representing user interaction. The responsiveness of your app is related to the availability of the UI thread to process work.

```
    </Cause>
    <ProposedSolution>
      <Decription>
```

Your app can be interactive even though there are parts of the app that aren't fully functional. For example, if your app displays data that takes a while to retrieve, you can make that code execute independently of the app's startup code by retrieving the data asynchronously. When the data is available, populate the app's user interface with the data.

To help keep your app responsive, the platform provides asynchronous versions of many of its APIs. An asynchronous API ensures that your active execution thread never blocks for a significant amount of time. When you call an API from the UI thread, use the asynchronous version if it's available.

```
    </Description>
    <Link>http://go.microsoft.com/fwlink/?LinkId=724349
    </Link>
</ProposedSolution>
<Actions>
    <Action Name="Open Timeline Profile"
    StartTime="x ms" EndTime="x ms">
    </Location>
</RuleId>
```

Such rule output is typically consumed by one or more UI hosts and/or log(s) where the information may be made available to a user(s) in a presentation format determined by the UI host(s) or log(s).

Finally, system, 210 may automate application of any recommended or proposed solution(s), such as those indicated in rule output. Such automated application may include modifying the code being analyzed by system 210 and/or a UI host(s) according to the recommended solution(s). Such automated application may be in response to a selection or instruction by a developer in response to presentation of the recommended or proposed solution(s).

FIG. 4 shows an example user interface of an example UI host presenting rule output 410 in a user interface, where the example UI host is a debugger tool. Such rule output presented in a UI may, for example, be in response to an error in code being debugged. The text of rule output 410 is shown in blow-up 420. Text 422 identifies the issue, which is example issue (a) above in this case. Text 422 (the first and second lines of 420) may be provided in a <RuleName> section of the example rule output shown above. Text 424 (the third line of 420) provides a link to additional information regarding the issue. Text 424 may be provided in an <Link> section of the example rule output shown above. A user may, for example, select this link as indicated by the circled mouse arrow in FIG. 4 to access the additional information. Text 426 (the fourth line of 420) provides a link to a profile tool which is an example mechanism for further investigating the issue. Text 426 may be provided in an <Actions> section of the example rule output shown above. Further, information and/or links from other sections of rule output may additionally or alternatively be presented in a user interface(s) such as that shown in FIG. 4 or otherwise.

Other user interfaces that present all or portions of rule output may be hosted by other tools as well. Such other tools include, but are not limited to, text editors, user interface editors, and other design-time tools, compilers, assemblers, linkers, and other compile-time tools, and interpreters, profilers, simulators, and other run-time tools including debuggers such as discussed in the example above. Other such tools include integrated development environments that may combine some or all of the afore-mentioned tools and any other development tools or the like. Tools that present at least portions of rule output in one or more user interfaces are referred to herein as "UI hosts" for system 210. Additionally or alternatively, system 210 may include its own UI, such as UI 218 or the like, and may thus also be considered a UI host.

CONCLUSION

In a first example, a method is performed on a on a computing device that includes at least one processor, memory, and an event analysis engine, the method comprising: receiving, by the event analysis engine from a development tool, at least one event that identifies at least one of a design-time, a compile-time, or a run-time issue associated with code; identifying, by the event analysis engine based on the at least one received event, at least one rule of a plurality of rules associated with development of the code, the at least one received event being mapped to the at least one identified rule; and evaluating, by the computing device, the at least one received event according to the at least one identified rule resulting in identification of a development issue associated with the code.

In a second example, there is a computing device comprising: at least one processor; memory coupled to the at least one processor; an event analysis engine configured to receive, from a development tool, at least one event that identifies at least one of a design-time, a compile-time, or a run-time issue associated with code; the event analysis engine further configured to identify, based on the at least one received event, at least one rule of a plurality of rules associated with development of the code, the at least one received event being mapped to the at least one identified rule; and the computing device configured to evaluate the at least one received event according to the at least one identified rule resulting in identification of a development issue associated with the code.

In a third example, at least one computer-readable medium that comprises computer-executable instructions that, based on execution by at least one processor of a computing device that includes memory, cause the computing device to perform actions comprising: receiving, by the event analysis engine from a development tool, at least one event that identifies at least one of a design-time, a compile-time, or a run-time issue associated with code; identifying, by the event analysis engine based on the at least one received event, at least one rule of a plurality of rules associated with development of the code, the at least one received event being mapped to the at least one identified rule; and evaluating, by the computing device, the at least one received event according to the at least one identified rule resulting in identification of a development issue associated with the code.

In the first, second, and third examples, the event analysis engine further generates, based on the evaluated at least one received event, rule output that indicates a cause of the development issue with the code, a proposed solution for the development issue with the code, and a tool for further investigating the development issue with the code; the event analysis engine further provides the generated rule output to a user interface host; the event analysis engine further provides the generated rule output to a log; the rule output further identifies the development issue; he at least one received event is evaluated based on state information generated based on previous evaluating of at least one previously-received event according to at least one previously-identified rule of the plurality of rules; and the at least one received event is mapped to the at least one identified rule via a categorization of the at least one received event.

The invention claimed is:

1. A method performed on a computing device that includes at least one processor and memory, the method comprising:
   receiving, by the computing device from a development tool, at least one event configured to identify a design-time, a compile-time, and a run-time issue associated with code;
   determining, from a plurality of categories, a category of the at least one event, wherein the plurality of categories comprise: best practices, application performance, accessibility, localization, or any other aspect of application development or operation;
   mapping, by the computing device based on a mapping information in a mapping store, the category of the at least one event to at least one rule of a plurality of rules in a rule store associated with development code;
   identifying, by the computing device based at least on the mapping, the at least one rule of the plurality of rules in the rule store associated with the development of the code, wherein each rule of the plurality of rules in the rule store includes an identifier that uniquely identifies the each rule from each other of the plurality of rules;
   evaluating, by the computing device based on the at least one identified rule, the at least one received event according to the at least one rule resulting in identification of a development issue associated with the code;
   generating, by the computing device based on said evaluating, a rule output that identifies a cause of the development issue associated with the code;
   displaying, by the computing device in a user interface host based at least on the evaluating, the identification of the development issue associated with the code and a proposed solution for the development issue associated with the code; and
   modifying, by the computing device based on the rule output, the code according to the proposed solution for the development issue associated with the code.

2. The method of claim 1 further comprising generating, by the computing device based at least on the evaluating, a tool for further investigating the development issue with the code.

3. The method of claim 2 further comprising providing, by the computing device, the generated rule output to the user interface host.

4. The method of claim 2 further comprising providing, by the computing device, the generated rule output to a log.

5. The method of claim 2 where the generated rule output further identifies the development issue.

6. The method of claim 1 where the at least one received event is evaluated based on state information generated based on previous evaluating of at least one previously-received event according to at least one previously-identified rule of the plurality of rules.

7. The method of claim 1 where the at least one received event is mapped to the at least one rule via a categorization of the at least one received event.

8. A computing device comprising:
   at least one processor;
   memory that is coupled to the at least one processor and that includes computer-executable instructions that, based on execution by at least one processor, cause the computing device to perform actions comprising:
      receiving, by the computing device from a development tool, at least one event configured to identify a design-time, a compile-time, and a run-time issue associated with code;
      determining, from a plurality of categories, a category of the at least one event, wherein the plurality of categories comprise: best practices, application performance, accessibility, localization, or any other aspect of application development or operation;
      mapping, by the computing device based on a mapping information in a mapping store, the category of the at least one event to at least one rule of a plurality of rules in a rule store associated with development code;
      identifying, by the computing device based at least on the mapping, the at least one rule of the plurality of rules in the rule store associated with the development of the code, wherein each rule of the plurality of rules in the rule store includes an identifier that uniquely identifies the each rule from each other of the plurality of rules;
      evaluating, by the computing device based on the at least one identified rule, the at least one received event according to the at least one rule resulting in identification of a development issue associated with the code;
      generating, by the computing device based on said evaluating, a rule output that identifies a cause of the development issue associated with the code;
      displaying, by the computing device in a user interface host based at least on the evaluating, the identification of the development issue associated with the code and a proposed solution for the development issue associated with the code; and
      modifying, by the computing device based on the rule output, the code according to the proposed solution for the development issue associated with the code.

9. The computing device of claim 8, the actions further comprising generating, by the computing device based at least on the evaluating, a tool for further investigating the development issue with the code.

10. The computing device of claim 9, the actions further comprising providing, by the computing device, the generated rule output to the user interface host.

11. The computing device of claim 9, the actions further comprising providing, by the computing device, the generated rule output to a log.

12. The computing device of claim 9 where the rule output further identifies the development issue.

13. The computing device of claim 8 where the at least one received event is evaluated based on state information generated based on previous evaluating of at least one previously-received event according to at least one previously-identified rule of the plurality of rules.

14. The computing device of claim 8 where the at least one received event is mapped to the at least one rule via a categorization of the at least one received event.

15. At least one computer-readable medium that comprises computer-executable instructions that, based on execution by at least one processor of a computing device that includes memory, cause the computing device to perform actions comprising:
   receiving, by the computing device from a development tool, at least one event configured to identify a design-time, a compile-time, and a run-time issue associated with code;
   determining, from a plurality of categories, a category of the at least one event, wherein the plurality of categories comprise: best practices, application performance, accessibility, localization, or any other aspect of application development or operation;

mapping, by the computing device based on a mapping information in a mapping store, the category of the at least one event to at least one rule of a plurality of rules in a rule store associated with development code;

identifying, by the computing device based at least on the mapping, the at least one rule of the plurality of rules in the rule store associated with the development of the code, wherein each rule of the plurality of rules in the rule store includes an identifier that uniquely identifies the each rule from each other of the plurality of rules;

evaluating, by the computing device based on the at least one identified rule, the at least one received event according to the at least one rule resulting in identification of a development issue associated with the code;

generating, by the computing device based on said evaluating, a rule output that identifies a cause of the development issue associated with the code;

displaying, by the computing device in a user interface host based at least on the evaluating, the identification of the development issue associated with the code and a proposed solution for the development issue associated with the code; and modifying, by the computing device based on the rule output, the code according to the proposed solution for the development issue associated with the code.

16. The at least one computer-readable medium of claim 15, the actions further comprising generating, by the computing device based at least on the evaluating, a tool for further investigating the development issue with the code.

17. The at least one computer-readable medium of claim 16, the actions further comprising providing, by the computing device, the generated rule output to the user interface host.

18. The at least one computer-readable medium of claim 16, the actions further comprising providing, by the computing device, the generated rule output to a log.

19. The at least one computer-readable medium of claim 16 where the rule output further identifies the development issue, or where the at least one received event is mapped to the at least one rule via a categorization of the at least one received event.

20. The at least one computer-readable medium of claim 15 where the evaluating is based on state information generated based on previous evaluating of at least one previously-received event according to at least one previously-identified one or more rules of the plurality of rules.

* * * * *